Dec. 31, 1935.    F. T. POWERS    2,026,000
CASSETTE
Filed Oct. 29, 1931
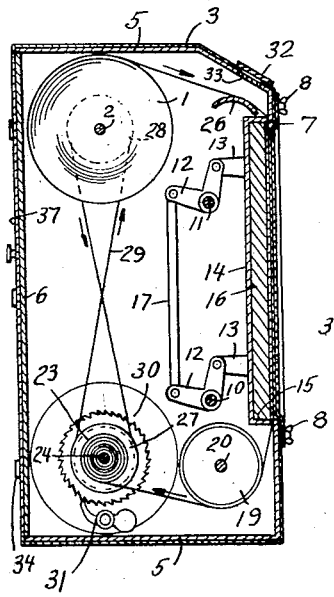
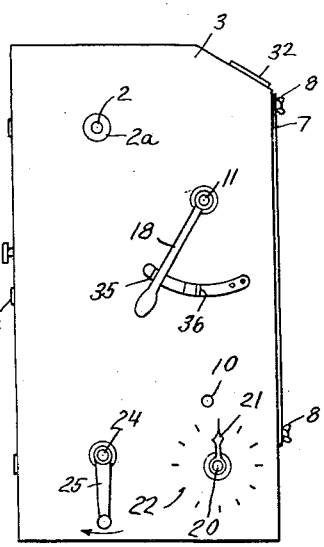
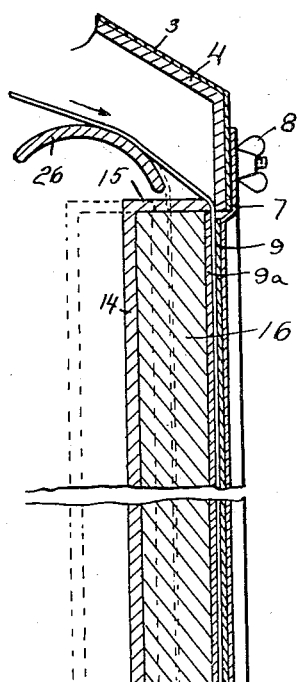
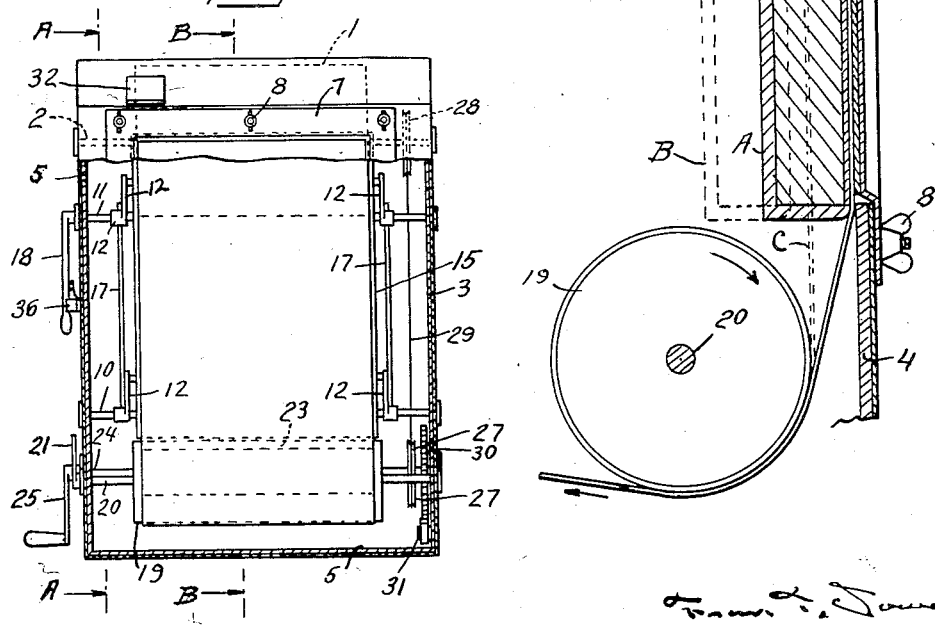
INVENTOR Patented Dec. 31, 1935

2,026,000

UNITED STATES PATENT OFFICE 2,026,000

CASSETTE

Frank T. Powers, Douglaston, N. Y.

Application October 29, 1931, Serial No. 571,819

5 Claims. (Cl. 250—34)

My invention relates to the radiographic art and more particularly to a method and an apparatus whereby greatly increased speed in making radiographs may be attained, especially of a larger number of successive patients.

Objects and advantages of the invention will be set forth in part hereinafter and in part will be obvious herefrom, or may be learned by practice with the invention, the same being realized and attained by means of the instrumentalities and combinations pointed out in the appended claims.

The methods and apparatus heretofore in use for making radiographs, while well adapted to the production of excellent results, are not adapted to the rapid making of many consecutive radiographs of successive patients with their widely varying anatomical characteristics in a minimum of time. The present method is slow and cumbersome. This slowness may be attributed largely to the holders, called cassettes, used for holding the ray sensitive medium in position during exposure to the rays, and to the form in which the sensitive medium is used. The present customary method is to place a sheet of sensitive membrane, such as a sensitized film, of the size of the radiograph to be made, in a light tight cassette or holder, in intimate contact with one or two intensifying screens of fluorescent material, where it is held in place by pressure applied by spring clips from the back of the cassette. This operation must be performed in a dark room, as the sensitive medium is sensitive to light rays as well as to X-rays. When about to make a radiograph the loaded cassette is placed in such position that the object to be radiographed is in proper relation to the cassette and the source of X-rays. The exposure is then made and the cassette returned to the dark room for unloading and reloading. The exposed sheet of sensitive membrane is placed in a specially constructed frame or holder in which the sensitized membrane is clamped at each one of its four corners by spring clamps, which hold the membrane in a substantially flat, distended position for development, fixing, washing and drying. The entire series of operations described above may, with the best of the apparatus and equipment now on the market, be completed in about half an hour, or if sufficient assistance is provided so that the operations are divided up between various operators, the time per patient or per radiograph may be appreciably reduced. In some well equipped and efficiently operated laboratories radiographs of anatomical objects, such for example, as the lung cavity in the upper half of the human torso, have been made at an average rate of from three to five per hour throughout the day. Smaller objects, such as hands or extremities, may be made at a faster rate.

The present method is a one-at-a-time method since each operation or step of the method is performed on but one radiograph at a time. The cassette holds but one sheet of sensitive medium; it must be loaded and unloaded one-at-a-time for each radiograph; the sensitive sheets are developed one at a time, washed, fixed and dried one at a time, examined and filed one at a time. But with my new method and cassette I am able to take anatomically identical or corresponding radiographs, such as the human lung cavity, at the rate of from two to three per minute, or from one hundred and twenty to one hundred and eighty per hour, notwithstanding the wide differences in their anatomical characteristics. This great increase in rate of production is one of the primary objects of my invention. It is accompanied by a corresponding reduction in the cost of labour for making and finishing the radiographs.

The invention lies in a process and in apparatus for carrying out the process. Instead of the slow, cumbersome process of handling cut-to-size film, loading and unloading cassettes made to hold but one sheet of film at a time, developing, fixing, washing and drying each radiograph separately, I use my sensitized membrane in a continuous strip of the width desired for each radiograph, but long enough to make a plurality of them. This sensitized strip is placed on a suitable spool, which is mounted on a mandrel or centres within my new cassette. By suitable mechanism in the cassette this roll of sensitized film is moved proper distances at each movement from one position within the cassette to another position where the exposed portion is wound up on another roll, having passed step by step through the exposure position and received a number of exposures to rays. The roll of exposed film is then removed from the cassette in daylight and developed in a well known type of developing machine, fixed, washed and dried, and may be examined while still in the form of a continuous strip, the whole process being performed at such a rate that many hundreds of finished, ready to examine radiographs may be turned out each working day.

My new process makes it possible to take radiographs of large groups of individuals, such as the pupils of a school or the employees of a factory, or an army of soldiers at the rate of from one hundred and twenty to one hundred and eighty per hour,—a rate never approached by any known method. The importance of this new method in the war against tuberculosis which admittedly can best be diagnosed by X-ray methods is obvious.

The full benefits of my new method are best attained when it is employed in conjunction with my X-ray apparatus described in my co-pending application Serial No. 589,401.

I will now describe in detail my new process and cassette, so that one skilled in the art may make and use the same.

In the drawing like symbols indicate the same or similar parts, and arrows indicate direction of movement or rotation.

Fig. 1 is a side view of the cassette. Fig. 2 is a sectional view on the line AA of Fig. 3 showing internal parts. Fig. 3 is a front view with portions broken away to expose internal parts. Fig. 4 is a sectional detail of the front portion of the cassette on the line BB of Fig. 3.

In Fig. 2 is shown the roll of sensitized medium, such as X-ray film on a spool 1 mounted on a removable shaft 2, which is supported in bearings 2A attached to the inside of the main case 3, consisting of a box-like structure of any suitable material, such as wood or metal, and lined or covered completely with sheet lead, of a thickness sufficient to safely protect the sensitive membrane from both direct and reflected rays. For lightness and strength I prefer to construct the case 3 of sheet aluminum, and I protect the interior from rays by lining the front portion 4, with sheet lead ⅛" thick, the sides, top and bottom 5, with sheet lead 3/32" thick, and the back 6, with sheet lead 1/16" thick. Obviously the amount of protection needed will vary with the type of service for which the cassette is to be used; but I find the above specified protection sufficient for anatomical radiographs, using not over 125 milliamperes and 85 kilovolts peak. On the front of the case is a rectangular opening and having no lead protection. The size of this opening is the size of the largest radiograph to be taken by the apparatus. The opening is covered by a removable plate 7 of suitable material, practically transparent to X-rays, such for example, as aluminum or a thermo-plastic composition. This plate is held in place by the studs and thumb nuts 8. To the inner surface of the removable front plate 7 is securely attached an intensifying screen 9 of well known type. On shafts 10 and 11 are fixed bell cranks 12, one arm of each of which is attached to one of four brackets 13, attached to the pressure member 14, of metal or the like, shaped like a shallow pan with sides 15 within which is a filling 16, of a resilient yielding material, such, for example, as felt or soft sponge rubber. To the surface of this filling I may also attach an intensifying screen 9A when I desire to use a sensitive membrane which is sensitized on two sides. Or I may omit either the screen 9 or screen 9A when I desire to use a sensitive membrane which is sensitized on one side only. The upper and lower bell cranks 12 are connected on each side of the case by vertical rods 17, and the upper shaft 11, which extends through the case 3, is provided with a hand lever 18, on the outside of the case, by the movement of which the pressure member 14, with its resilient filling material may be moved toward or away from the front plate 7, to either position B indicated by the dotted lines in Fig. 4, or to position A, in which position it is pressed tightly against the front plate in position A indicated by full lines in Fig. 4.

Below the pressure member 14 is a roller 19 mounted on a shaft 20, one end of which extends through the side of case 3 and carries a pointer 21, which cooperates with a dial 22, to indicate the length of sensitized film moved foward as hereinafter described.

A wind up spool 23, is mounted on a shaft 24, one end of which extends through the side of case 3 and is provided with a crank handle 25, by means of which the sensitive membrane may be wound up on the spool 23. Above the pressure member 14, is a guide bar 26, extending across the case from side to side, with its front edge a short distance, for example ½ inch, from the inside of the front of the case. On shafts 2 and 24 are fixed two grooved pulleys 27 and 28, connected with a cross belt 29. On shaft 24 is also fixed a toothed ratchet wheel 30, engaging a pawl 31, attached to the case. On the top of the case is provided a window consisting of a movable cover 32 of lead and an inserted sheet of ruby glass 33. The back of the case consists of two doors 37, lined with lead, carried by the hinges 34. The hand lever 18 is provided with cooperating catches 35 and 36 attached to the side of the case by means of which the hand lever may be releasably held in position at either side of its arc of movement. Having described in detail the construction of one form of my new cassette, I will now describe its method of operation.

A roll of sensitive membrane wound upon the spool 1 is placed upon the removable shaft 2 and the shaft and spool are dropped into place in the bearing 2A. The roll of membrane is provided with a strip of opaque paper or other suitable opaque membrane on the outside of the roll. This opaque membrane, called a "leader" is several feet long and permits loading the cassette in daylight in a manner well known and commonly used in loading hand cameras. The leader is passed over the guide 26 and down through the space between the pressure member 14, and the plate 7, over the measuring roll 19 and to the wind-up spool 23, to which it is attached by means of a strip of adhesive tape or other convenient method. While this loading operation is in progress the pressure member, by movement of the lever 18, to engage the catch 36, is placed in its position away from the plate 7, or the plate 7 may be removed from the front of the cassette to facilitate the operation. The doors 37, are then closed and by means of the crank 25, the spool 23, is rotated in a clockwise direction to wind up the leader and pull over the sensitive membrane to which it is attached. The cover 32, of the window is lifted, giving a view through the ruby glass 33 permitting the operator to observe when the leader has passed and the sensitive membrane comes into view. Additional turns of the crank 25, are made until the movement of the pointer 21, indicates that the end of the sensitive membrane has passed the exposure position in front of the pressure member 14. The lever 18, is then moved to engage the catch 35, and cause the pressure member with its resilient filling 16, to press the sensitive membrane into intimate contact with the intensifying screen or screens 9. The apparatus is now ready for the making of a radiograph upon that portion of the sensitive membrane which is in contact with the intensifying screen, all other portions of the sensitive membrane being completely shielded and protected from action of the rays by the lead coverings described above. After exposure to the rays, the lever 18, is released from the catch 35, and moved over to engage the catch 36, thus moving the face of the filling of the pressure chamber 14, to position B shown by the dotted lines in Fig. 4, and releasing the pressure on the sensitive membrane and leaving the membrane in a slack or loose condition between the guide bar 26, and the measuring roll 19, in the position indicated by the dotted lines C in Fig. 4. This feature of the design and operation of the cassette is of great importance as the loose or slack strip of membrane has an opportunity to align itself and relieve any tendency to creep to one side or other of the measuring roll. It has been found that when the strip of sensitive membrane is wound up under tension with no slack interval for self adjustment, it has a tendency to creep to one side or the other of the wind-up spool 23, and burr the edge of the membrane. The crank 25, is again turned in a clockwise direction and at the instant of starting the belt 29 acts to turn the spool 1 in the opposite direction, taking all slack out of the membrane between the two spools and drawing it taut over the guide bar 26, and the measuring roller 19. The friction of the belt 29, on the pulleys 27 and 28 is not sufficient to prevent moving the membrane, but only sufficient to keep it taut. The crank 25, is turned until the pointer 21 indicates by its movement over the dial 22, that the entire exposed portion of the membrane has been moved out of its exposure position into a shielded position and an unexposed portion moved into exposure position. The ratchet 30, and pawl 31, prevents the spool 23 from reversing its direction of rotation and permitting the membrane to become slack upon releasing the crank 25. The lever 18 is then moved over to engage the catch 35, thus pressing the membrane again into intimate contact with the intensifying screen and the apparatus is again ready for the making of a radiograph. These operations are repeated successively until all of the sensitive membrane on the spool 1 has passed the exposure position. To the end of the membrane is attached a second leader of opaque paper, which is now wound up on the outside of the membrane on spool 23, by means of the crank 25, and the spool of exposed membrane is ready for removal from the cassette and for final development.

It will be obvious to one skilled in the art that many modifications in the construction and arrangement of parts which I have shown in the drawing may be made to adapt my cassette to a variety of uses without departing from the spirit of the invention, as set forth in the following claims.

I claim:

1. A cassette for X-ray radiography with provision for handling and exposing successive lengths of a long strip of sensitized material, the cassette comprising a casing having an X-ray permeable window therein, winding reels within the casing and operating means including a handle external of the casing for winding measured lengths of said strip past said window onto one of said reels and from off the other reel, means other than said strip tending to rotate said latter reel in a direction to create tension in the strip along its length and in the section thereof extending between the two reels during the winding operation and means within the casing movable into and out of a predetermined position to press an entire area of the strip corresponding to the exposure area into a plane for exposure to X-rays through said window in the casing.

2. A cassette for X-ray radiography with provision for handling and exposing successive lengths of a long strip of sensitized material, the cassette comprising a casing having an X-ray permeable window therein, winding reels within the casing and operating means including a handle external of the casing for winding measured lengths of said strip past said window onto one of said reels and from off the other reel, means other than said strip controlled by said operating means tending to rotate said latter reel in a direction to create tension in the strip along its length and in the section thereof extending between the two reels during the winding operation and means within the casing movable into and out of a predetermined position to press an entire area of the strip corresponding to the exposure area into a plane for exposure to X-rays through said window in the casing.

3. A cassette for X-ray radiography with provision for handling and exposing successive lengths of a long strip of sensitized material, the cassette comprising a casing having an X-ray permeable window therein, winding reels within the casing and operating means including a handle external of the casing for winding measured lengths of said strip past said window onto one of said reels and from off the other reel, a frictional driving connection between said winding reels for creating tension in the strip along its length and in the section thereof extending between the two reels during the winding operation and means within the casing movable into and out of a predetermined position to press an entire area of the strip corresponding to the exposure area into a plane for exposure to X-rays through said window in the casing.

4. A cassette for X-ray radiography with provision for handling and exposing successive lengths of a long strip of sensitized material, the cassette comprising a casing having an X-ray permeable window therein, winding reels within the casing and operating means for winding measured lengths of said strip past said window onto one of said reels and from off the other reel, means within the casing movable into and out of a predetermined position to press an area of the strip into a plane for exposure to X-rays through said window in the casing, said last-mentioned means when out of said predetermined position producing slack in said strip, and strip tensioning means extending between reels tending to rotate said latter reel to take up a part of said slack, said means being operative upon winding of the strip onto said first-mentioned reel.

5. A cassette for X-ray radiography with provision for handling and exposing successive lengths of a long strip of sensitized material, the cassette comprising a casing having an X-ray permeable window therein, winding reels within the casing, means for winding said strip off one reel and onto the other, a pressure member adapted to engage an area of said strip registering with said window and to be withdrawn from such engagement and thereby effect a slackening of the tension in said strip between said reels, and means in association with said latter reel tending to rewind a part of the slack portion of said strip on said latter reel to thereby maintain proper alignment of the strip with the reels.

FRANK T. POWERS.